E. HUTSON.
Saw-Arbors.
No. 148,563.  Patented March 17, 1874.
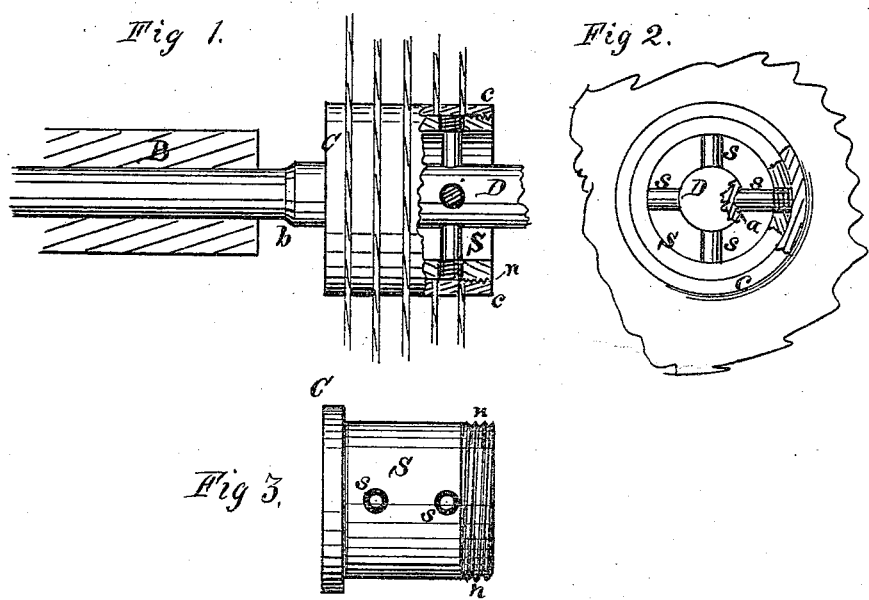

UNITED STATES PATENT OFFICE.

EZRA HUTSON, OF BROCKPORT, NEW YORK.

IMPROVEMENT IN SAW-ARBORS.

Specification forming part of Letters Patent No. 148,563, dated March 17, 1874; application filed February 17, 1874.

*To all whom it may concern:*

Be it known that I, EZRA HUTSON, of Brockport, in the county of Monroe and State of New York, have invented certain new and useful Improvements in Circular-Saw Arbors; and I do hereby declare that the following is a full, clear, and exact description thereof, reference being had to the accompanying drawing making part of this specification, in which—

Figure 1 is a sectional side view of one end of a saw-mandrel, having my improved arbor attached. Fig. 2 is a sectional end view of the same. Fig. 3 is a side view of the sleeve.

This invention consists in suspending a solid sleeve upon a mandrel, by means of several centering-screws, so as to constitute a hollow arbor, designed more especially to be used for gangs of circular saws.

The object of my invention is to provide a simple and efficient hollow arbor for circular saws, which arbor shall be sustained upon the mandrel with as little metal intervening between them as possible, thereby providing the greatest amount of opening or space for the circulation of air.

The sleeve S is made of any desired length and diameter, according to the number and size of saws to be used upon it. It is made solid, with a collar, C, on one end, and the other end is properly threaded to receive the clamping-collar $c$. This sleeve is centered and fixed upon the shaft or mandrel in the following manner: The mandrel D is first turned off and the sleeve S properly bored out, so as to leave any desired space between the mandrel and the sleeve when the latter is fixed thereon. Two centering-heads, each having one conical face, are provided, which are nicely fitted to the mandrel, and upon which they are placed with the sleeve between them, and when arranged over that section of the mandrel to to which it is to be hung, the centering-heads are forced toward each other firmly, so as to clamp and center the sleeve S, and the holes drilled through the sleeve for the screws $s$, which may be countersunk into the shaft at $a$, Fig. 2, or they may pass through the mandrel, the same screw answering for two supports. The holes through the sleeve may then be tapped out and the screws inserted, after which the centering-heads are removed. The mandrel and sleeve is then placed in a lathe, and the outer surface of the latter turned off and threaded, as shown at $n$, to receive the clamping-collar $c$. If desired, the holes may be drilled and tapped in the sleeve before it is put upon the mandrel D. The screws might be threaded their whole length, or that portion reaching from the sleeve to the mandrel may be turned smaller, as shown. Three screws only might be employed at each end of the sleeve, instead of four.

It will be seen that, by this construction and arrangements of the parts, but little metal intervenes between the mandrel D and the sleeve S, there being no collar or rings encircling the former to become heated therefrom, and to communicate or transmit the same to the saws. Of course a single saw may be used upon this sleeve-arbor, but it is intended more especially for gangs.

It will be seen that, by placing the journal box or bearing B away from the shoulder $b$, there is less liability of heating the journal, and also of transmitting such heat, should it occur, to the saws.

End chase of the mandrel is prevented by shoulders at the opposite end of the mandrel. An ordinary spline may be applied to the sleeve, and the saws and collars made to fit it, which would drive the saws, and the threaded collar would only be necessary to clamp the saws together and upon the sleeve.

I do not claim a "built-up" saw-arbor, composed of a series of "hollow collars" like those shown in the patent of Wm. P. Hale, dated October 5, 1869, and numbered 25,582; but

What I claim as my invention is—

The suspended sleeve-arbor, constructed substantially in the manner and for the purposes set forth.

EZRA HUTSON.

Witnesses:
WM. S. LOUGHBOROUGH,
WILLIAM R. WOOD.